(12) United States Patent
Felty

(10) Patent No.: US 6,536,846 B1
(45) Date of Patent: Mar. 25, 2003

(54) UTILITY TRAILER WITH AN OPENING TAILGATE ASSEMBLY FOR A GARDEN TRACTOR OR THE LIKE

(76) Inventor: Johnathon Felty, 1120 Summerhill Rd., Auburn, PA (US) 17922

( * ) Notice: Subject to any disclaimer, the term of this patent is extended or adjusted under 35 U.S.C. 154(b) by 0 days.

(21) Appl. No.: 09/621,831

(22) Filed: Jul. 24, 2000

Related U.S. Application Data

(60) Provisional application No. 60/468,499, filed on Feb. 7, 2000.

(51) Int. Cl.7 .................................................. B60P 1/00
(52) U.S. Cl. .......................... 298/6; 298/5; 298/23 DF; 298/17 T
(58) Field of Search ............................. 298/5, 6, 23 D, 298/23 DF, 17 T; 280/63

(56) References Cited

U.S. PATENT DOCUMENTS

| | | | | |
|---|---|---|---|---|
| 1,014,734 A | * | 1/1912 | Witten | 298/6 |
| 1,278,971 A | * | 9/1918 | Mayer | 298/23 DF |
| 2,131,326 A | * | 9/1938 | Kaster | 298/6 |
| 2,419,636 A | * | 4/1947 | Foy | 298/23 DF |
| 2,765,193 A | * | 10/1956 | McGrew | 298/6 |
| 3,260,547 A | * | 7/1966 | Helig et al. | 298/5 |
| 3,917,343 A | * | 11/1975 | Taylor et al. | 298/23 DF |
| 4,968,096 A | * | 11/1990 | Chattin | 298/6 |

FOREIGN PATENT DOCUMENTS

| | | | | |
|---|---|---|---|---|
| GB | 4536 | * | 11/1880 | 298/23 DF |
| SU | 1006286 | * | 3/1983 | 298/6 |

* cited by examiner

Primary Examiner—Stephen T. Gordon
(74) Attorney, Agent, or Firm—John D. Gugliotta

(57) ABSTRACT

The present invention is a self-unloading garden utility cart. A conveyor belt is located on the bottom of the cart and the tailgate is spring-loaded. A lever opens the tailgate and a crank turns the conveyor belt, which runs on pulleys. The hitch is attached via a trailer hitch to any lawn tractor or truck.

11 Claims, 3 Drawing Sheets

UTILITY TRAILER WITH AN OPENING TAILGATE ASSEMBLY FOR A GARDEN TRACTOR OR THE LIKE

RELATED APPLICATIONS

The present invention was first described in Disclosure Document No. 60/468,499 filed on Feb. 7, 2000. There are no previously filed, nor currently any co-pending applications, anywhere in the world.

BACKGROUND OF THE INVENTION

1. Field of the Invention

The present invention relates generally to material handling attachments for work vehicles and, more particularly, to a utility trailer with an opening tailgate assembly for a garden tractor or the like.

2. Description of the Related Art

Maintenance of one's lawn, landscaping and garden is a seemingly never-ending task. Depending upon the size of the yard/garden, there are a countless number of chores that require the attention of the owner. Mowing the lawn, raking, trimming, mulching, pulling weeds, planting, the list goes on and on. One popular tool used by many to aid in the growth and beauty of one's lawn and/or garden is the garden tractor used with a utility trailer. This combination makes quick work of transporting mulch, topsoil, gravel and other similar products. Their use however requires the user to not only load the trailer with these products but unload them as well. Not only does this take time and physical effort for the homeowner, it also translates into increased operating time and cost for the professional. Additionally, those users who are elderly or physically disabled find it difficult to repeatedly bend over to open the tailgate, tip the trailer, empty the contents, reattach the trailer, close the tailgate and so on.

A search of the prior art did not disclose any patents that read directly on the claims of the instant invention; however, the following references were considered related.

The following patents disclose an electrically-operated material handling attachment for a garden tractor.

U.S. Pat. No. 4,897,013 issued in the name of Thompson et al.

U.S. Pat. No. 4,770,595 issued in the name of Thompson et al.

The following patents describe a dump cart.

U.S. Pat. No. 4,417,765 issued in the name of Wirsbinski

U.S. Pat. No. 3,731,974 issued in the name of Stafford

U.S. Pat. No. 2,867,474 issued in the name of Linn

U.S. Pat. No. 5,364,224 issued in the name of Padgett discloses a portable, tiltable hopper assembly.

U.S. Pat. No. 4,969,533 issued in the name of Holm et al. describes a tractor with an implement lift system.

U.S. Pat. No. 4,795,305 issued in the name of Friend discloses a cable-operated loader apparatus.

U.S. Pat. No. 4,787,197 issued in the name of Schweigert describes a multi-purpose cart and grass catcher.

U.S. Pat. No. 4,532,756 issued in the name of Merkel discloses a grass catching receptacle for dumping and bagging.

U.S. Pat. No. 4,042,141 issued in the name of Schweigert describes a multi-purpose cart and grass catcher.

Consequently, a need has been felt for a means by which the user of a garden tractor trailer can simply empty the contents of the trailer from the seat of the garden tractor with minimal physical effort.

SUMMARY OF THE INVENTION

Therefore, it is an object of the invention to provide for. Briefly described according to one embodiment of the present invention, a trailer si provided for use with a garden tractor with an integral unloading mechanism. The floor of the container box consists of moving conveyor belt suspended between two rollers. The conveyor is connected to a hand crank located at the front corner of the box near the hitch. Also located near the crank is an actuating lever that opens the spring-loaded tailgate. Thus the driver of the garden tractor can operate the invention from the seat of the tractor, by simply turning around. The invention is particularly useful for those who may be physically impaired or find it difficult to repeatedly bend over to operate a conventional cart.

The use of the present invention allows the unloading of topsoil, mulch, gravel and other similar products from a garden tractor trailer in a simple, quick, and easy manner.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE PREFERRED EMBODIMENT

Figure 1:
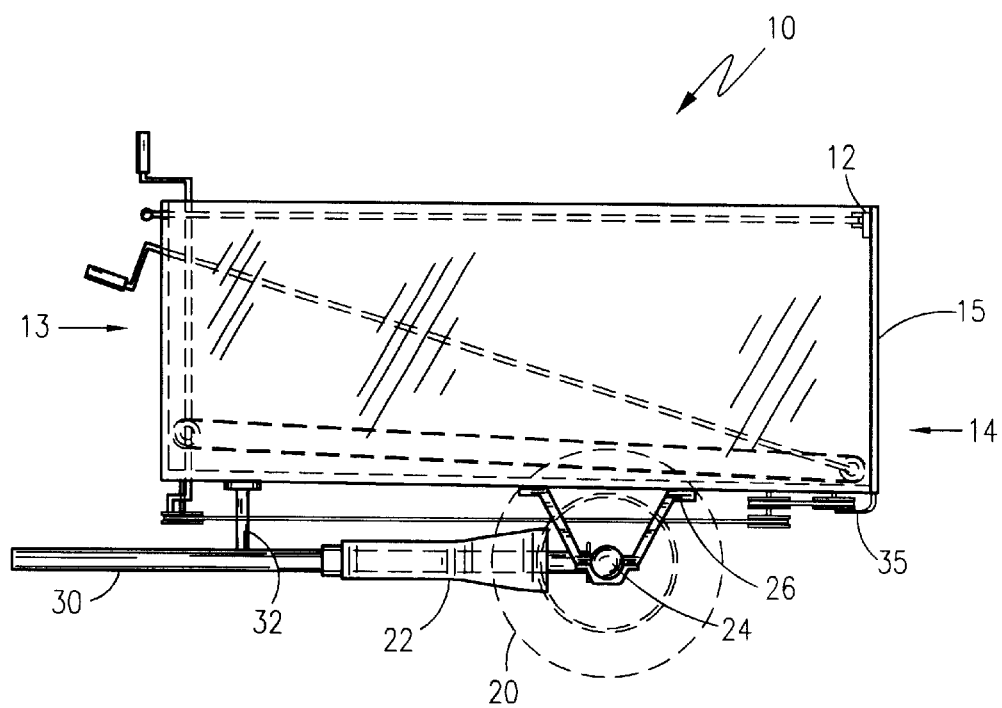
FIG. 1 is a side elevational view of a utility trailer with a manually operated opening and closing tailgate assembly according to the preferred embodiment of the present invention.

Referring now to FIG. 1, a utility trailer with a manually operated opening and closing tailgate assembly 10 is shown, according to the present invention, comprised of a cargo container 12 having an anterior end 13 opposite a posterior end 14, and forming a front side opposite a tailgate 15, a first lateral side opposite a second lateral side and a bottom 16, all intersecting to defining a cargo space.

The cargo container 12 is mounted on a wheel assembly 20 including a wheel support chassis 22, an axle 24, axle supports 26 and wheels 27. The wheel support chassis 22 is generally of a rectangular, platelike configuration mounted on the bottom 16 of the cargo container 12 and converges forward to an apex.

The axle support 26 has generally a V-shape extending from an axle 24 to flanges 28. The means for mounting the cargo container 12 on the wheel assembly 20 includes the flanges 28 coupled on the axle supports 26 which are slidably received into channels 29 coupled on the underside of the wheel support chassis 22. The channels 29 and flanges 28 are substantially parallel to each other. The axle support 26 is secured to the bottom 16 of the cargo container 12 by fasteners, such as, by way of example and not by limitation, bolts and nuts.

The axle 24, supporting a pair of wheels 27 rotatably mounted thereon, is rotatably mounted on the axle support 26.

A drawbar 30 for attachment of the utility trailer 10 to a powered vehicle is of a linearly elongated cylindrical configuration and is secured at one end to the axle 24, and extending forward therefrom medially of the sides of the cargo container 12 and further extending through the apex of the wheel support chassis 22. Positioned midway along and on an upper surface of the drawbar 30 is a support member 32 interposed between an upper surface of the drawbar 30 and the cargo container 12. The support member 32, being of an elongated tubular configuration and extending a length between 2 and 3.5 inches, is designed to elevate the anterior end 13 of the cargo container 12 to allow for easier unloading of the contents contained in the cargo space 12.

The tailgate 15, being pivotally secured to the posterior end 14 of the first side of the cargo container 12 via hinges, allowing a user to open and close the tailgate 15 in a swinging manner much like opening and closing a door on an automobile. The tailgate 15, further having a fin portion 35 extending between 1.5 and 2 inches below the bottom 16 of the cargo container 12 for coupling an end of a linkage arm 34 thereto as described in greater detail below.

Mounted near the top and on the cargo area side of the tailgate 15 is a spring-loaded tailgate locking means 40 for allowing the tailgate 15 to be locked and unlocked.

Mounted on the front side of the cargo container 12 and oriented laterally to and above the drawbar 30 is a tailgate lock releasing means 42. The tailgate lock releasing means 42 is of a linearly elongated cylindrical configuration extending the length of the cargo container 12 from the front side to the tailgate 15 being biased by a spring 44. The tailgate lock releasing means 42 is adapted to coact with the tailgate locking means 40 to releasably maintain the tailgate 15 in a fixed position, i.e. an open position. The tailgate lock releasing means 42 being positioned in an easily accessible location thereby allowing a user to empty the contents of the cargo area 12 from the seat of a powered vehicle, such as a garden tractor (not shown) with minimal physical effort with a simple pull on the tailgate lock releasing means 42. Upon closing the tailgate 15, the tailgate lock releasing means 42 coacts with the tailgate locking means 40 so as to maintain the tailgate 15 in a releasably locked position. The aforementioned cycle is then repeated by a user for locking and unlocking the tailgate 15.

Figure 2:
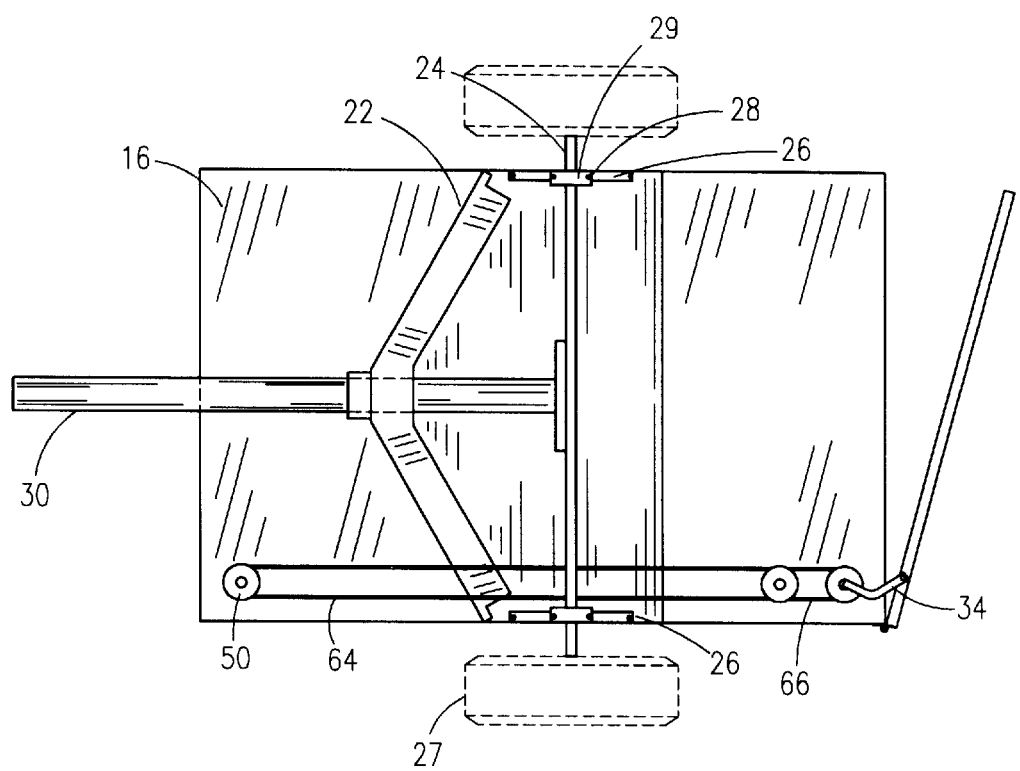
FIG. 2 is a bottom plan view thereof.
Figure 3:
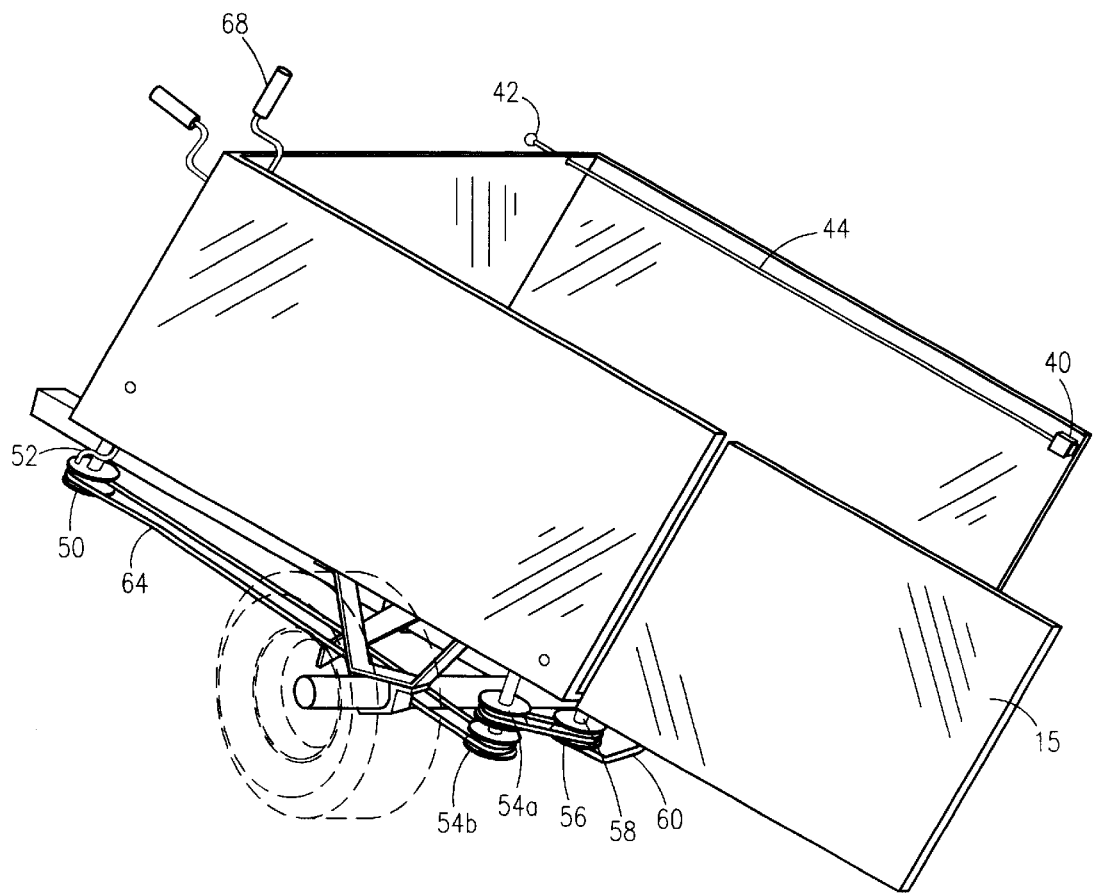
FIG. 3 is a partial side perspective thereof showing in greater detail the features and elements of the cargo container 12 for use therewith.

As best shown in FIG. 2, in conjunction with FIG. 3, located underneath and extending the length of the cargo container 12 is a manually operated tailgate opening and closing assembly having an anterior pulley 50 coupled at the anterior end 13 of the bottom 16 of the cargo container 12 by an anterior pulley connecting rod 52. The anterior pulley connecting rod 52 is coupled to the bottom 16 of the cargo container 12 to serve as a mounting bracket for the anterior pulley 50. The anterior pulley 50 is positioned horizontally and is freely rotatable about its connecting rod 52.

Located just behind the support chassis 22 is a first mesial pulley 54a a second mesial pulley 54b. The first mesial pulley 54a and the second mesial pulley 54b rest in a horizontal position parallel to each other and have a pulley axle inserted and extending there through and coupling the first mesial pulley 54a and the second mesial pulley 54b to the bottom of the cargo container 12. Being freely rotatable about the pulley axle, the first mesial pulley 54a and the second mesial pulley 54b are coaxially mounted on the pulley axle.

Located distal to the first mesial pulley 54a and the second mesial pulley 54b is a posterior pulley 56 positioned horizontally and coupled to the bottom 16 of the cargo container 12 by a posterior pulley connecting rod 58. Similarly, the posterior pulley 56 is freely rotatable about the posterior pulley connecting rod 58. The posterior pulley 56 is fixed to rotate with the posterior pulley connecting rod 58, thereby rotating an L-shaped linkage arm 60 secured at a forward end and also fixed to rotate with the posterior pulley connecting rod 58. The linkage arm 60 has an outer end coupled to the forward side of the fin portion 35 of the tailgate 15 and positioned between the posterior pulley 56 and the bottom 16 of the cargo container 12. A primary belt 64 is operatively connected to anterior pulley 50 and extends from anterior pulley 50 to the second mesial pulley 54b. A secondary belt 66 is operatively connected to the first mesial pulley 54a and extends from the first mesial pulley 54a to the posterior pulley 56.

The tailgate opening and closing assembly is actuated by engaging a crank 68 in a rotating, clockwise fashion for opening tailgate 15. Likewise, rotating the crank 68 in a counter-clockwise fashion operates to close the tailgate 15. The crank 68 is envisioned as being of a linearly elongated cylindrical configuration resting in a vertical position having a handle and Z-shaped ends with Z-shaped ends extending just beyond the length of the front side of the cargo container 12.

The lower end of crank 68 is coupled to a face of the anterior pulley 50. Actuation of the handle of the crank 68 causes the lower end of crank to engage the anterior pulley 50 into a rotating fashion which causes the second mesial pulley 54b to rotate in the same direction; in turn causing the first mesial pulley 54a to rotate, being coaxially connected. Rotation of the first mesial pulley 54a actuates rotation of the posterior pulley 56 in the direction relative to the first mesial pulley. Rotation of the posterior pulley 56 causes the linkage arm 60 to be extended forward when the crank 68 is rotated in a clockwise manner, thereby opening the tailgate 15 and the linkage arm 60 is retracted when the crank 68 is rotated in a counterclockwise manner, thereby closing the tailgate 15.

The tailgate opening and closing assembly allows a user to open and close the tailgate 15 and empty the contents of the cargo area 12 with minimal physical effort while remaining seated on a garden tractor (not shown).

The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A utility trailer with a manually operated opening and closing tailgate assembly comprising:

a cargo container having an anterior end opposite a posterior end; said cargo container forming a front side opposite a tailgate, a first lateral side opposite a second lateral side and a bottom; said anterior end, said posterior end, said front side, said tailgate, said first lateral side, said second lateral side and said bottom intersecting to define said cargo space;

a wheel assembly, said wheel assembly is of a rectangular, platelike configuration mounted on said bottom of said cargo container and converging forward to an apex; and a tailgate opening and closing assembly, said tailgate opening and closing assembly being manually operated and located underneath and extending a length of said cargo container.

2. The utility trailer with a manually operated opening and closing tailgate assembly of claim 1, wherein said cargo container is mounted on said wheel assembly via flanges coupled on V-shaped axle supports slidably received into channels on an underside of said wheel assembly; said axle supports secured to said bottom of said cargo container by fasteners.

3. The utility trailer with a manually operated opening and closing tailgate assembly of claim 2, wherein said wheel assembly further comprises an axle, said axle supporting a pair of wheels rotatably mounted to said axle; and said axle rotatably mounted on said axle supports.

4. The utility trailer with a manually operated opening and closing tailgate assembly of claim 3, wherein said axle having one end of a drawbar secured to said axle; said drawbar is of a linearly elongated cylindrical configuration extending forward from said axle and medially of said first lateral side and said second lateral side of said cargo container and further extending through an apex of said wheel support chassis; and said drawbar for attaching the present invention to a powered vehicle.

5. The utility trailer with a manually operated opening and closing tailgate assembly of claim 4, wherein said drawbar having a support member positioned midway along and on an upper surface of said drawbar; said support member being of an elongated tubular configuration and extending a length between 2 and 3.5 inches is designed to elevate said anterior end of said cargo container.

6. The utility trailer with a manually operated opening and closing tailgate assembly of claim 1, wherein said tailgate is pivotally secured to said posterior end of said first lateral side of said cargo container via hinges.

7. The utility trailer with a manually operated opening and closing tailgate assembly of claim 6, wherein said tailgate having a fin portion extending between 1.5 and 2 inches below said bottom of said cargo container for coupling an end of a linkage arm to said fin portion.

8. The utility trailer with a manually operated opening and closing tailgate assembly of claim 7, wherein said tailgate further having a spring-loaded tailgate locking means mounted near a top and on a cargo area side of said tailgate for allowing said tailgate to be locked and unlocked.

9. The utility trailer with a manually operated opening and closing tailgate assembly of claim 2, wherein said cargo container further having a tailgate lock releasing means; said tailgate lock releasing means is of a linearly elongated cylindrical configuration extending a length of said cargo container from said front side to said tailgate; said tailgate lock releasing means being biased by a spring; and said tailgate lock releasing means mounted on said front side of said cargo container and oriented lateral to and above a drawbar.

10. The utility trailer with a manually operated opening and closing tailgate assembly of claim 9, wherein said tailgate lock releasing means coacting with a tailgate locking means to releasably maintain said tailgate in a fixed position; and said tailgate lock releasing means being positioned in an easily accessible location.

11. The utility trailer with a manually operated opening and closing tailgate assembly of claim 1, wherein said tailgate opening and closing assembly further comprising:

an anterior pulley, said anterior pulley coupled at said anterior end of said bottom of said cargo container by an anterior pulley connecting rod; said anterior pulley connecting rod coupled to said bottom of said cargo container; said anterior pulley is freely rotatable about said anterior pulley connecting rod;

a first mesial pulley and a second mesial pulley, said first mesial pulley and said second mesial pulley resting parallel in a horizontal position; said first mesial pulley and said second mesial pulley having a pulley axle inserted and extending through said first mesial pulley and said second mesial pulley; said first mesial pulley and said second mesial pulley being coaxially mounted on and freely rotatable about said pulley axle; and said pulley axle coupling said first mesial pulley and said second mesial pulley to said bottom of said cargo container;

a posterior pulley, said posterior pulley located distal to said first mesial pulley and said second mesial pulley; said posterior pulley positioned horizontally and coupled to said bottom of said cargo container by a posterior pulley connecting rod; said posterior pulley being freely rotatable about said posterior pulley connecting rod;

a linkage arm, said linkage arm having an outer end coupled to a forward side of a fin portion of said tailgate; said linkage arm positioned between said posterior pulley and said bottom of said cargo container; said linkage arm being fixed to rotate with said posterior pulley connecting rod;

a primary belt, said primary belt operatively connected to said anterior pulley and extending from said anterior pulley to said second mesial pulley;

a secondary belt, said secondary belt operatively connected to said first mesial pulley and extending from said first mesial pulley to said posterior pulley;

a crank, said crank is of a linearly elongated cylindrical configuration resting in a vertical position having a handle and Z-shaped ends with one of said Z-shaped ends extending just beyond a length of said front side of said cargo container; said crank having a lower end coupled to a face of said anterior pulley; said handle of said crank causing said lower end of said crank to engage said anterior pulley in a rotating fashion and further causing said first mesial pulley and said second mesial pulley to rotate in a same direction; said posterior pulley rotating and causing said linkage arm to extend forward when said crank is rotated in a clockwise manner; said linkage arm retracting when said crank is rotated in a counterclockwise manner.

* * * * *